E. F. BAUER.
AUTOMATIC BELT SHIFTER.
APPLICATION FILED MAY 6, 1910.
1,015,933.
Patented Jan. 30, 1912.
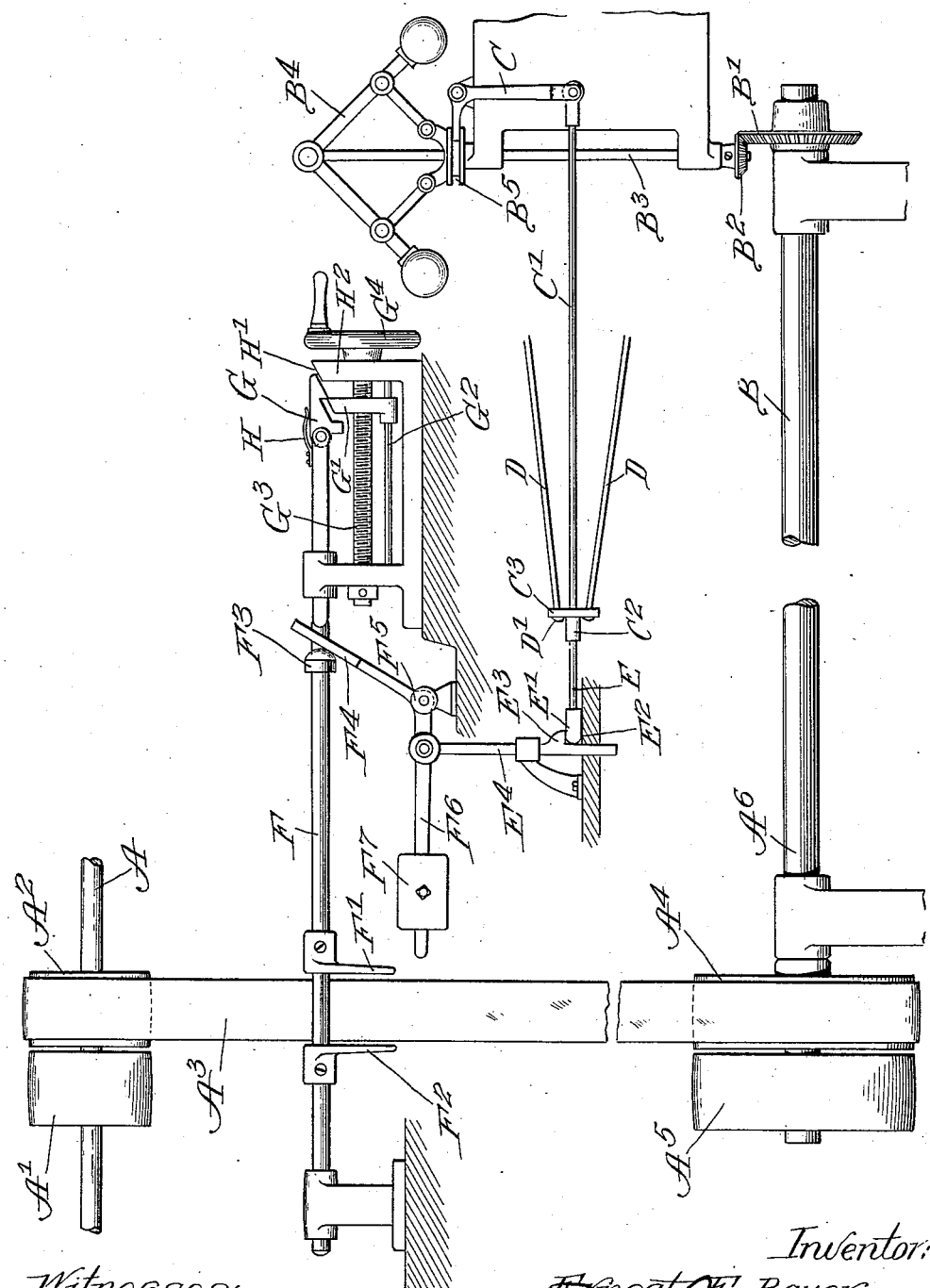

UNITED STATES PATENT OFFICE.

ERNEST F. BAUER, OF RAVENNA, OHIO.

AUTOMATIC BELT-SHIFTER.

1,015,933.  Specification of Letters Patent. Patented Jan. 30, 1912.

Application filed May 6, 1910. Serial No. 559,661.

*To all whom it may concern:*

Be it known that I, ERNEST F. BAUER, a citizen of the United States, residing at Ravenna, in the county of Portage and State of Ohio, have invented a certain new and useful Improvement in Automatic Belt-Shifters, of which the following is a specification.

My invention relates to improvements in belt shifters, and has for its object to provide means for automatically shifting the belt to stop the machine when the speed of any part of the machine drops below a certain predetermined value.

The invention is illustrated in the accompanying drawing which shows a diagrammatic representation of a machine whereon such device is shown.

The counter shaft A carrying the pulleys $A^1$, $A^2$, drives the belt $A^3$, which in turn drives the tight pulley $A^4$ and loose pulley $A^5$ on the drive shaft $A^6$ of any desired machine. The shaft $A^6$ drives, by any suitable gears or other mechanism not shown, the different parts of the machine.

The shaft B, which is one of the driven shafts of the machine, carries the miter gear $B^1$ engaging with the gear $B^2$ to drive the shaft $B^3$ upon which is mounted the rotary ball governor $B^4$ having the usual annular grooved collar $B^5$. The bell crank C engages at one end the grooved collar $B^5$, at the other the rod $C^1$ which is provided at its outer end with the head $C^2$ to engage the plate $C^3$ which is slidably mounted upon the rod $C^1$. The rods D provided with the heads $D^1$ also slidably engage the plate $C^3$ and may be connected with similar governors not shown.

The link E is rigidly attached to the plate $C^3$ and has at its outer end the head $E^1$ riding upon the bearing surface $E^2$ and adapted to engage the lug $E^3$ on the rod $E^4$. The shaft F carrying the belt shifting prongs $F^1$, $F^2$, has the enlargement $F^3$ in contact with the arm $F^4$ of the bell crank $F^5$. The arm $F^6$ carries the weight $F^7$ and is connected near its fulcrum to the rod $E^4$.

The hook G, pivotally mounted upon one end of the rod F is adapted to engage the nut $G^1$ which rides upon the rod $G^2$ and may be moved by means of the screw $G^3$ which in turn is rotated by means of the wheel $G^4$. The spring H is adapted to maintain the hook G in operative contact with the nut $G^1$. The cam surface $H^1$ upon the top of the support $H^2$ is adapted to force the hook G out of engagement with the nut $G^1$ as the nut approaches the support $H^2$.

It will be evident that while I have shown an apparatus which is in effect operative, still my drawing is more or less diagrammatic and many changes might be made in size, shape and arrangement of the parts without departing materially from the spirit of my invention.

The use and operation of my invention are as follows: In combination with a belt driven machine such, for instance, as a textile loom or spinning machine, it is frequently necessary that the entire mechanism stop should any part give way or any part slow down beyond a certain point. In the past this stoppage has been done by the operator but it will be evident that where hundreds of different parts are found in one machine, no single operator can watch all of them and stop the machine at once should any break occur. I have provided means for stopping such a machine, said means comprising centrifugal or other governors, which are adapted, should the part from which the governor is driven reach too low a velocity, to stop the machine. I do this by means of a weight which is released by the action of the governor and acts to gradually force the belt shifter against the belt and gradually carry the belt from the tight to the loose pulley. In textile machines it is necessary that the machine be gradually started. For this purpose a belt shifter having a screw threaded arrangement is used whereby the screw may be rotated and the belt gradually moved across from the loose to the tight pulley. Such an arrangement would, of course, prevent the operation of this weight were not some means interposed there between, and I have provided a catch which operates merely until the belt has been carried completely onto the tight pulley, whereupon such catch becomes inoperative, leaving the belt shifter free to respond to the action of the weight as controlled by the governor.

In speaking of a belt shifter it must be understood that I employ a belt shifter as an example of any device which may be used to transmit power from any suitable power developing device and a clutch or electric switch might be used in the place of a belt for connecting and disconnecting the power.

I claim:—

1. The combination with a belt driven machine and belt shifter therefor of manually operative means for moving said belt shifter and means for disconnecting said manually operative means when the belt shifter is at the end of its path.

2. The combination of a belt driven machine and belt shifter therefor, manually operative means for moving said belt into operative position together with automatic means for moving said belt out of operative position and means for disconnecting said manually operative shifting means.

3. The combination of a belt driven shaft, a belt and a belt shifter therefor, means for manually moving said shifter to bring the belt either into or out of operative position said means comprising a screw and nut together with separate means independent of said manually operative means for moving the belt shifter to bring the belt out of operative position.

4. The combination of a belt driven shaft, a belt and a belt shifter therefor, means for manually moving said shifter to bring the belt either into or out of operative position said means comprising a screw and nut together with automatic means independent of said manually operative means for moving the belt shifter to bring the belt out of operative position.

5. The combination with a belt shifter containing a longitudinally movable rod, of a latch upon said rod, a manually operative part in engagement with said latch, means for automatically disengaging said latch from said manually operative part and means for automatically actuating said belt shifter when said latch is out of engagement with said manually operative part.

6. The combination of a driving belt with a shifter therefor, automatic means containing said shifter to shift the belt out of operative position, means containing said shifter to shift the belt into position, and means for disconnecting the shifting-in mechanism.

7. The combination of a driving belt with a shifter therefor, automatic means containing said shifter to shift the belt out of operative position, means containing said shifter to shift the belt into position, and automatic means for disconnecting the shifting-in mechanism.

8. The combination of a driving belt with a shifter therefor, automatic means containing said shifter to shift the belt out of operative position, means containing said shifter to shift the belt into position, and means for disconnecting the shifting-in mechanism at the end of its shifting-in operation.

9. The combination of a driving belt with a shifter therefor, automatic means containing said shifter to shift the belt out of operative position, manually operated means containing said shifter to shift the belt into position, and means for disconnecting the shifting-in mechanism.

10. The combination of a driving belt with a shifter therefor, automatic means containing said shifter to shift the belt out of operative position, manually operated means containing said shifter to shift the belt into position, and automatic means for disconnecting the shifting-in mechanism.

11. The combination of a driving belt with a shifter therefor, automatic means containing said shifter to shift the belt out of operative position, manually operated means containing said shifter to shift the belt into position, and means for disconnecting the shifting-in mechanism at the end of its shifting-in operation.

12. The combination with a belt driven shaft and driving belt therefor of a belt shifter, a bell crank in opposition to said belt shifter, a weight supported upon said bell crank, means for supporting said weight, a governor driven from said shaft, means for withdrawing the support from said weight when the governor reaches a predetermined speed, a hook attached to said belt shifter, a screw-threaded rod carrying a latch in opposition to said hook, means for rotating said rod and means for disengaging said hook from said latch when the latch is at the end of its excursion.

ERNEST F. BAUER.

Witnesses:
GEORGE COOPER,
J. S. ALLEN.

Copies of this patent may be obtained for five cents each, by addressing the "Commissioner of Patents, Washington, D. C."